Feb. 5, 1924.

T. J. STURTEVANT 1,483,048

APPARATUS FOR MEASURING AND MIXING MATERIALS

Filed Oct. 18, 1921   6 Sheets-Sheet 1

Inventor
Thomas J. Sturtevant
By Henry T. Williams
Atty.

Feb. 5, 1924.
T. J. STURTEVANT
APPARATUS FOR MEASURING AND MIXING MATERIALS
Filed Oct. 18, 1921     6 Sheets-Sheet 3
1,483,048
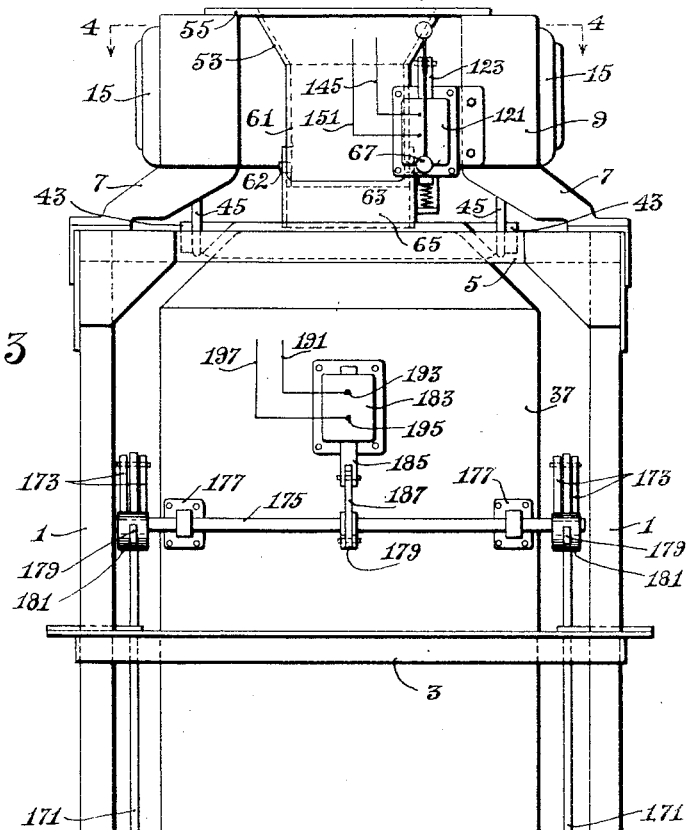
Fig. 3
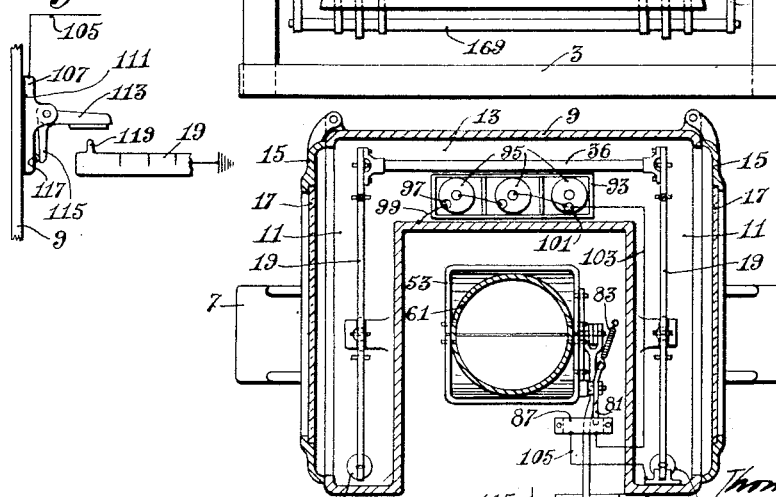
Fig. 4a
Fig. 4
Inventor
Thomas J. Sturtevant
By Henry T. Williams
Atty.

Feb. 5, 1924.

T. J. STURTEVANT 1,483,048

APPARATUS FOR MEASURING AND MIXING MATERIALS

Filed Oct. 18, 1921  6 Sheets-Sheet 6

Inventor
Thomas J. Sturtevant
By Henry T. Williams
Atty.

Patented Feb. 5, 1924.

1,483,048

UNITED STATES PATENT OFFICE.

THOMAS J. STURTEVANT, OF WELLESLEY, MASSACHUSETTS, ASSIGNOR TO STURTE-VANT MILL COMPANY, OF BOSTON, MASSACHUSETTS, A CORPORATION OF MASSA-CHUSETTS.

APPARATUS FOR MEASURING AND MIXING MATERIALS.

Application filed October 18, 1921. Serial No. 508,491.

*To all whom it may concern:*

Be it known that I, THOMAS J. STURTE-VANT, a citizen of the United States, residing at Wellesley, in the county of Norfolk and State of Massachusetts, have invented an Improvement in Apparatus for Measuring and Mixing Materials, of which the following description, in connection with the accompanying drawings, is a specification, like characters on the drawings representing like parts.

The invention to be hereinafter described relates to apparatus for measuring and mixing materials, and more particularly to apparatus for use in the manufacture of acid or "super" phosphate, although it is to be understood the invention is not limited thereto.

In the manufacture of acid phosphate, the ground phosphate rock and acid, such for example, as sulphuric acid, in proper proportions preferably determined by weight, are thoroughly mixed. Then the mixture is introduced into a den and allowed to set for a period. Here a chemical reaction takes place converting the mixture into acid phosphate. The materials solidify into a mass of sponge-like appearance, which is then broken down into finely flaked form and aerated. The material is then conveyed to a pit and thence to storage piles, in readiness for shipment as desired.

For economical, efficient production of acid phosphate of proper quality, it is essential that the ground phosphate rock and acid shall be mixed in correct portions. One of the purposes of the present invention, therefore, is to provide apparatus for insuring proper proportions of these ingredients. To accomplish this, in the present instance of the invention, apparatus is provided including a pair of scales, one for the ground phosphate rock and the other for the acid. These materials are delivered to the scales from a suitable source, and when charges of predetermined weight have been received by the scales, the apparatus automatically interrupts further flow of the materials thereto, thereby insuring proper weights of the ingredients and without requiring attention of the operator attending the apparatus.

It is essential that these ingredients shall be delivered to a mixing machine and be thoroughly mixed thereby. Another purpose of the invention therefore, is to provide the apparatus with means whereby the weighed charges may be delivered from the scales to the mixing machine. In the present instance of the invention, means is provided for automatically delivering the charges from the scales to the mixer at the proper time, but the construction is such that the delivery may be accomplished manually if desired.

The mixing machine may be of any suitable construction, and in the present instance a mixer is employed substantially the same as that disclosed in Letters Patent of the United States No. 1,393,181, granted to me October 11, 1921. This mixer has a rotary casing provided with a mouth which receives the weighed charges when in up position, and discharges the mixed materials when in down position. Mounted in the casing are devices which thoroughly mix the materials while the casing is rotating from receiving to discharging position.

The mixing machine may have means for automatically arresting rotation of the mixer casing to cause the mouth thereof to dwell a sufficient period when in up position to receive the ground rock and acid charges from the scales. Another purpose of the invention is to provide means for automatically initiating rotation of the casing after the charges have been received thereby. The casing is rotated slowly, and if desired may be rotated continuously, the size of the casing mouth being sufficiently large to receive the charges in the course of its movement through its up position.

The construction of the apparatus may be such that successive charges of the ground phosphate rock and acid may be automatically weighed, delivered to the mixer, thoroughly mixed, and discharged from the mixer with desirable economy of time and labor.

The character of the invention will be best understood by reference to the following description of one good form of the invention shown in the accompanying drawings, wherein.

Figure 2:
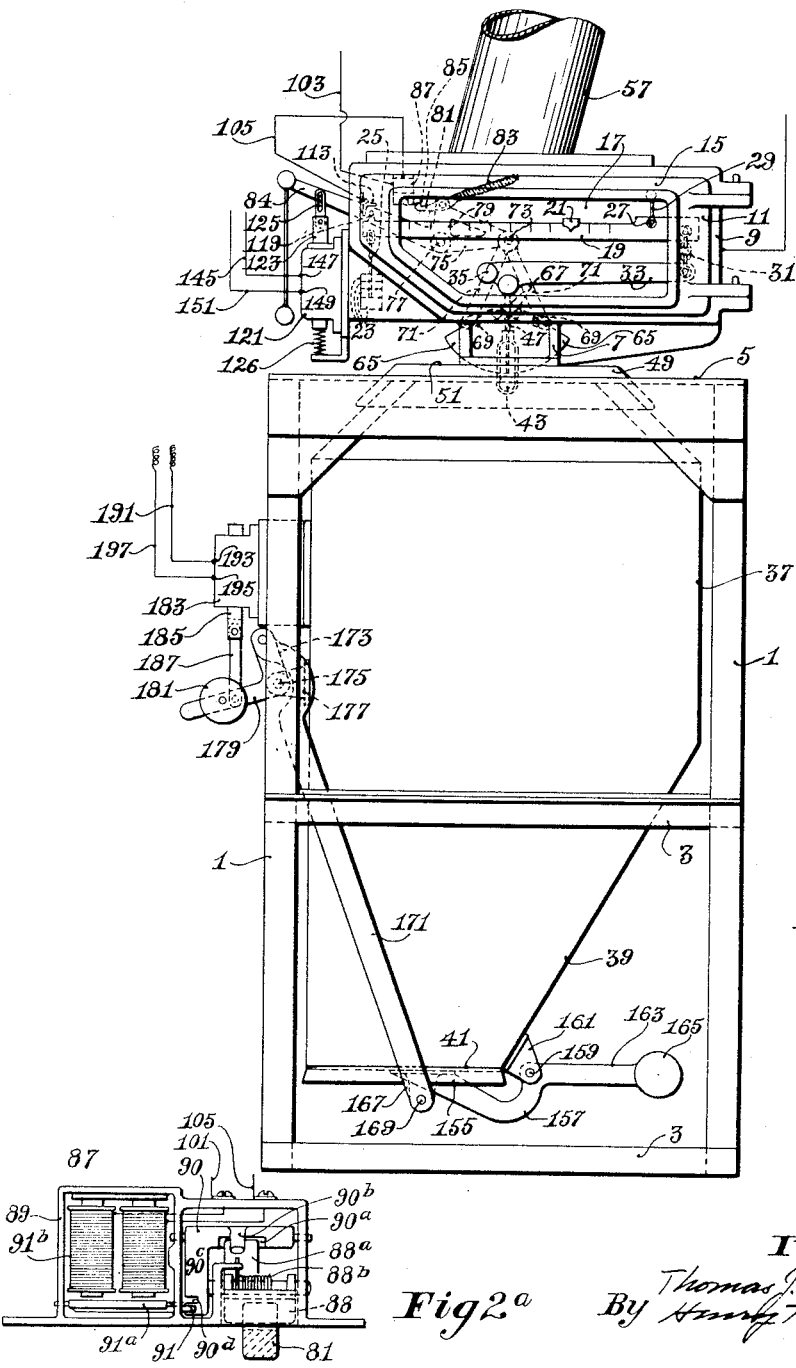
Fig. 2 is a view partly in elevation and partly in section of the apparatus for weighing the ground phosphate rock.
Figure 5:
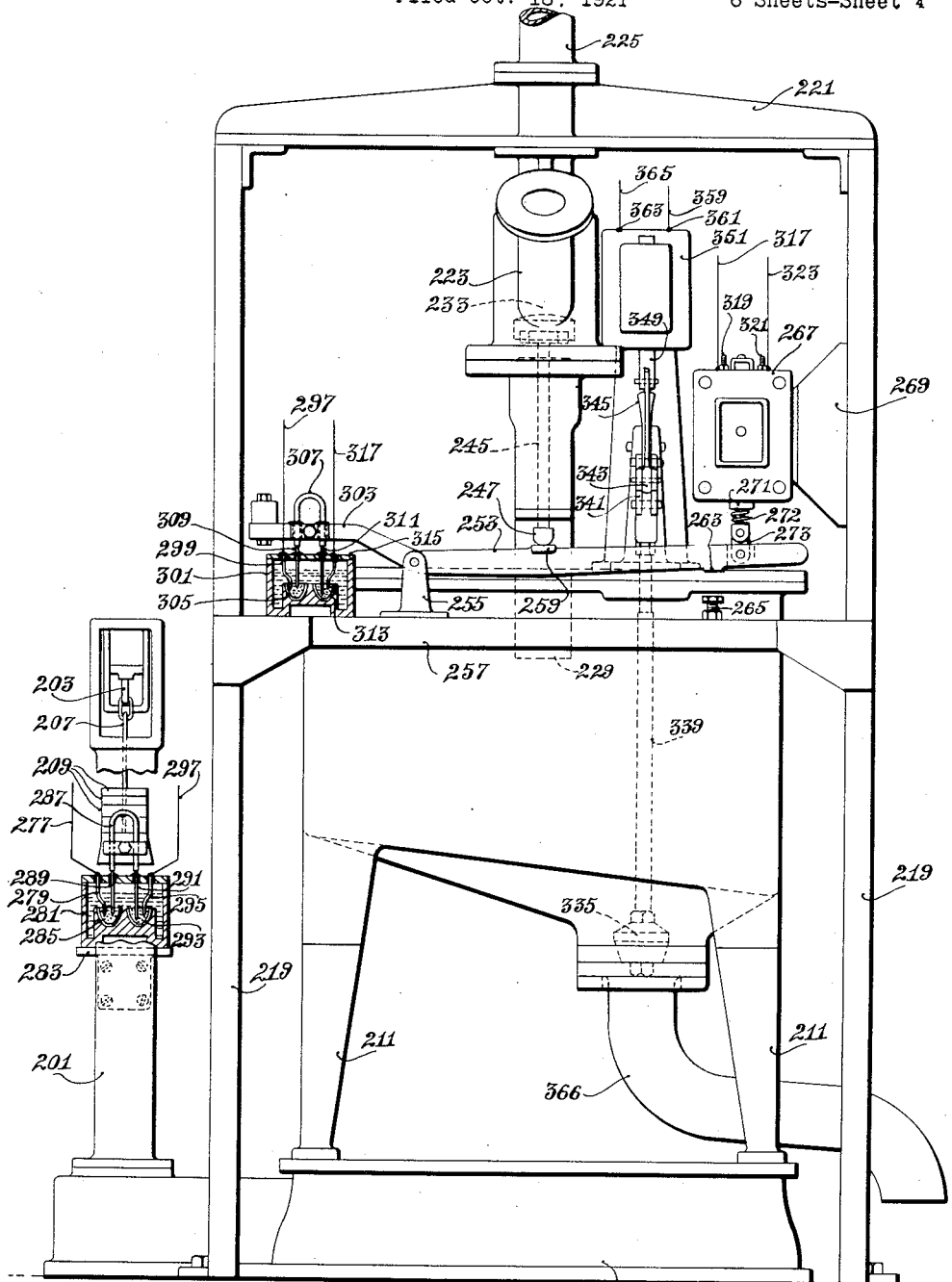
Figure 6:
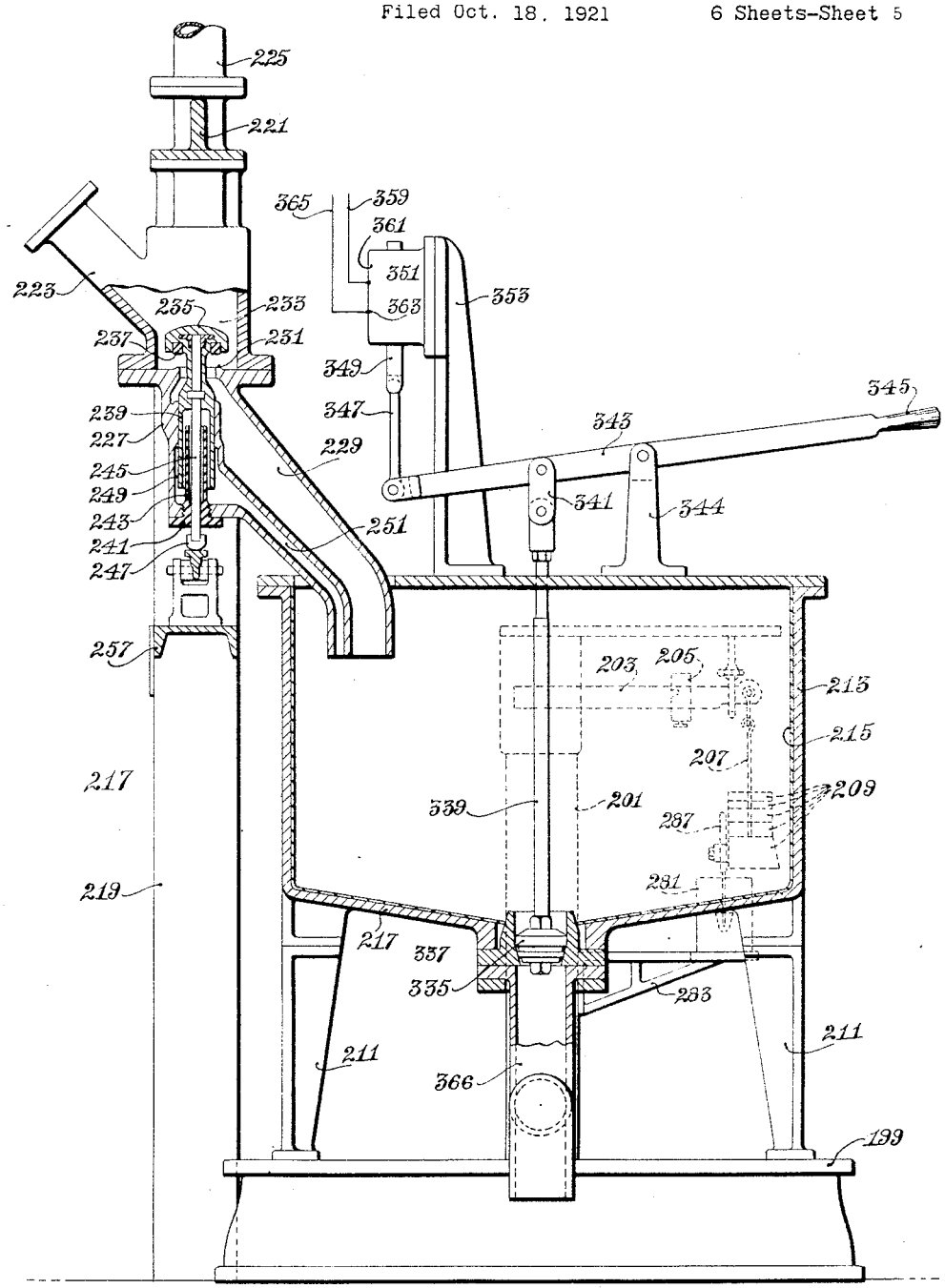
Figure 7:
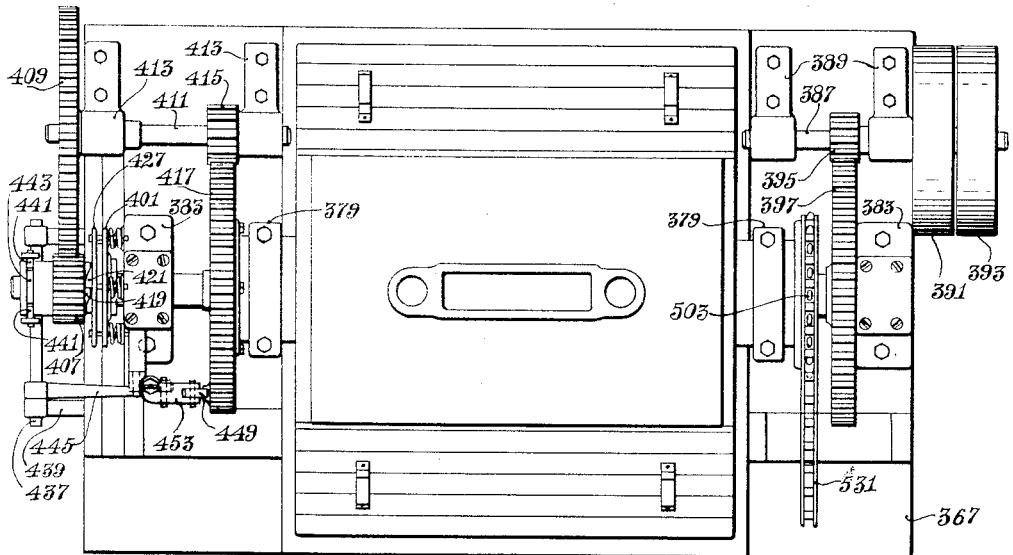
Figure 9:
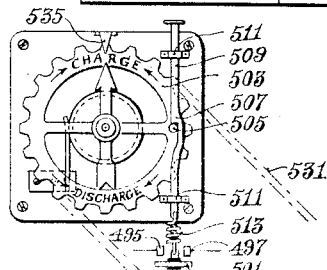
Figure 8:
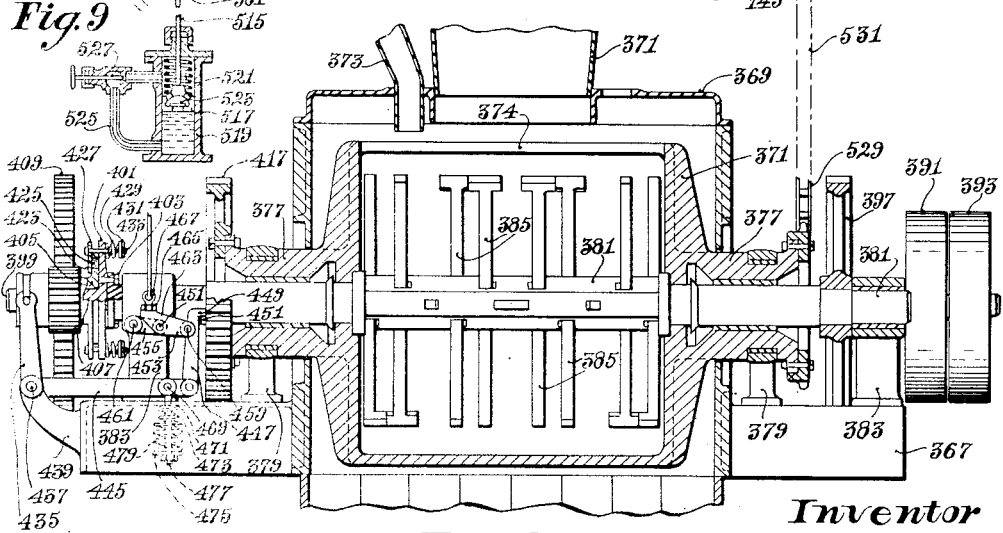

Fig. 2ᵃ is a detail view of the shutter latch lock;

Fig. 3 is a view of the apparatus shown in Fig. 2, and taken at right angles thereto;

Fig. 4 is a horizontal section taken on line 4—4 of Fig. 3;

Fig. 4ᵃ is a detail to be referred to;

Fig. 5 is an elevation of the apparatus for weighing the acid, certain parts being shown in section;

Fig. 6 is a view of the apparatus shown in Fig. 5 taken at right angles thereto;

Fig. 7 is a plan of the mixing machine;

Fig. 8 is a view of the mixer shown in Fig. 7, taken partly in section and partly in side elevation; and Fig. 9 is a detail to be referred to.

Referring to the drawings, the apparatus shown therein as one good form of the invention, comprises as stated, a pair of measuring devices, one for weighing the charges of ground phosphate rock, and the other for weighing the charges of acid.

The machine for weighing the charges of ground phosphate rock, in the present instance, comprises a support which may be conveniently in the form of standards 1 (Figs. 2 and 3) connected by cross bars 3 and surmounted by top bars 5.

Mounted on the top bars 5 are brackets 7 supporting a casing 9 (Fig. 4) of general U-shape providing scale chambers 11 and a rear chamber 13. The scale chambers may have doors 15 provided with windows 17.

Each of the scale chambers may contain a weighing mechanism of usual construction comprising a beam 19, a poise 21 thereon, and weights 23 carried by a rod 25 depending from the free end of the beam.

The beam is supported intermediate its ends by knife lugs 27 resting in eyes of links 29 mounted in the casing. The rear end of the beam is connected by a link 31 with one end of a lever 33, the opposite end 35 of which is pivotally mounted on the casing. The beams may be connected by a cross bar 36 so as to move in unison.

The levers 33 of the weighing mechanism may support a container 37 having a tapered lower end 39 leading to an outlet 41. In the present instance, the upper end of the container is provided with a pair of lugs 43 carried by links 45 on rods 47 suitably connected to the levers 33 intermediate the ends thereof. At the top of the container is a flange 49 and an inlet aperture 51.

Suitable means may be provided for delivering the ground phosphate rock to the container. To accomplish this, in the present instance, a hopper 53 may be provided having a flange 55 mounted on the scale casing 9. The materials may be delivered from a suitable source to the hopper through a chute 57 (Fig. 2). A neck 61 depends from the hopper and between the beam chambers 11 and 13 and serves to conduct the materials from the hopper to the container 37.

The present invention contemplates that means shall be provided for automatically controlling the supply of material to the container, the construction being such that charges of predetermined weight are delivered thereto. This means, in the present instance, comprises an inlet valve conveniently in the form of a shutter 63 having members 65 secured to stud shafts 67 fulcrumed on the neck 61 referred to. Fast on these stud shafts are arms 69 connected to the lower ends of links 71, the upper ends of which are pivotally connected to one end of a lever 75 fulcrumed on a stud 77 mounted on the neck 61. Projecting from the lever 75 is an arm 79 having a latch 81 pivotally connected thereto. A coil spring 83 has one end connected to the latch, and its opposite end anchored on the neck 61. The lever 75 may be extended to present a handle 84.

The latch 81 has a nose 85 adapted to be held by an electric lock 87 (Fig. 2ᵃ) of well known construction, comprising a latch 88 pivotally mounted in a casing 89. The latch has an arm 88ᵃ projecting to a rock shaft 90 having a shoulder 90ᵃ, an arm 90ᵇ and an arm 90ᶜ, the latter being provided with a notch 90ᵈ. The latch arm 88ᵃ is urged against the rock shaft shoulder 90ᵃ by a coil spring 88ᵇ.

Co-operating with the rock shaft arm 90ᶜ is a lug 91 on a pivotally mounted armature 91ᵃ of a magnet 91ᵇ, controlled by an electrical circuit to be described.

When the shutter is in open position, the shutter lever latch 81 will be held by the shutter closing spring 83 against the lock latch 88, while the latter is held from rocking by engagement of its arm 88ᵃ with the rock shaft arm 90ᵇ and by engagement of the rock shaft arm 90ᶜ with the armature lug 91.

When the magnet 91ᵇ is energized, its armature is rocked up against the influence of gravity, thereby moving the armature lug 91 out from engagement with the rock shaft arm 90ᶜ. This allows the lock latch 88 to rock and release the shutter lever latch 81, thereby allowing the coil spring 83 to operate through the lever 75 and links 71 to snap the shutter members 65 together and cut off the flow of materials with a minimum dribble.

On escape of the lever latch 81 from the lock latch, the coil spring 88ᵇ rocks the lock latch 88 back to normal position and causes its arm 88ᵃ to rock the shaft 90 and arm 90ᶜ until the latter is limited by engagement with a wall of the lock casing 89. Then the arm 90ᶜ is in position to be held again by the armature lug 91.

When a charge of predetermined weight has been delivered into the container, the weighing beams will rise, and thereupon complete an electric circuit for energizing the lock magnet 91ᵇ. To accomplish this, in the present instance, a battery 93 (Fig. 4) may be mounted in the rear chamber of the casing 9, said battery, in the present instance, being provided with three cells 95. One terminal 97 of this battery is connected to a conductor 99 which is grounded on the casing 9. Another terminal 101 is connected by a conductor 103 with the lock magnet 91ᵇ. The latter in turn is connected by a conductor 105 with a bracket 107 (Fig. 4ᵃ) mounted on the casing 9 and insulated therefrom. A contact arm 113 may be pivotally mounted on the bracket 107, and said arm may have a heel 115 adapted to engage a stop 117 on the bracket to limit rocking of the arm in a clockwise direction. One of the beams 19 may have a contact 119 (Fig. 2) on the free end thereof directly beneath the contact arm 113.

The construction is such that when the beam rises, the beam contact 119 will engage the contact arm 113 and thereby complete the circuit for the lock magnet 91ᵇ. This will release the latch 81 and close the shutter to cut off the supply of materials to the container as described.

The shutter may be opened manually or automatically as desired. To effect the manual operation, the handle 84 is pulled downward, thereby opening the shutter members 65, tensioning the coil spring 83, and bringing the latch 81 in position to be held by the lock 87.

To accomplish automatic opening of the shutter, a solenoid 121 (Figs. 2 and 3) may be mounted on the casing 9, and may have its core 123 connected by a link 125 with the handle 84. The core is urged upward by a spring 126.

Figure 1:
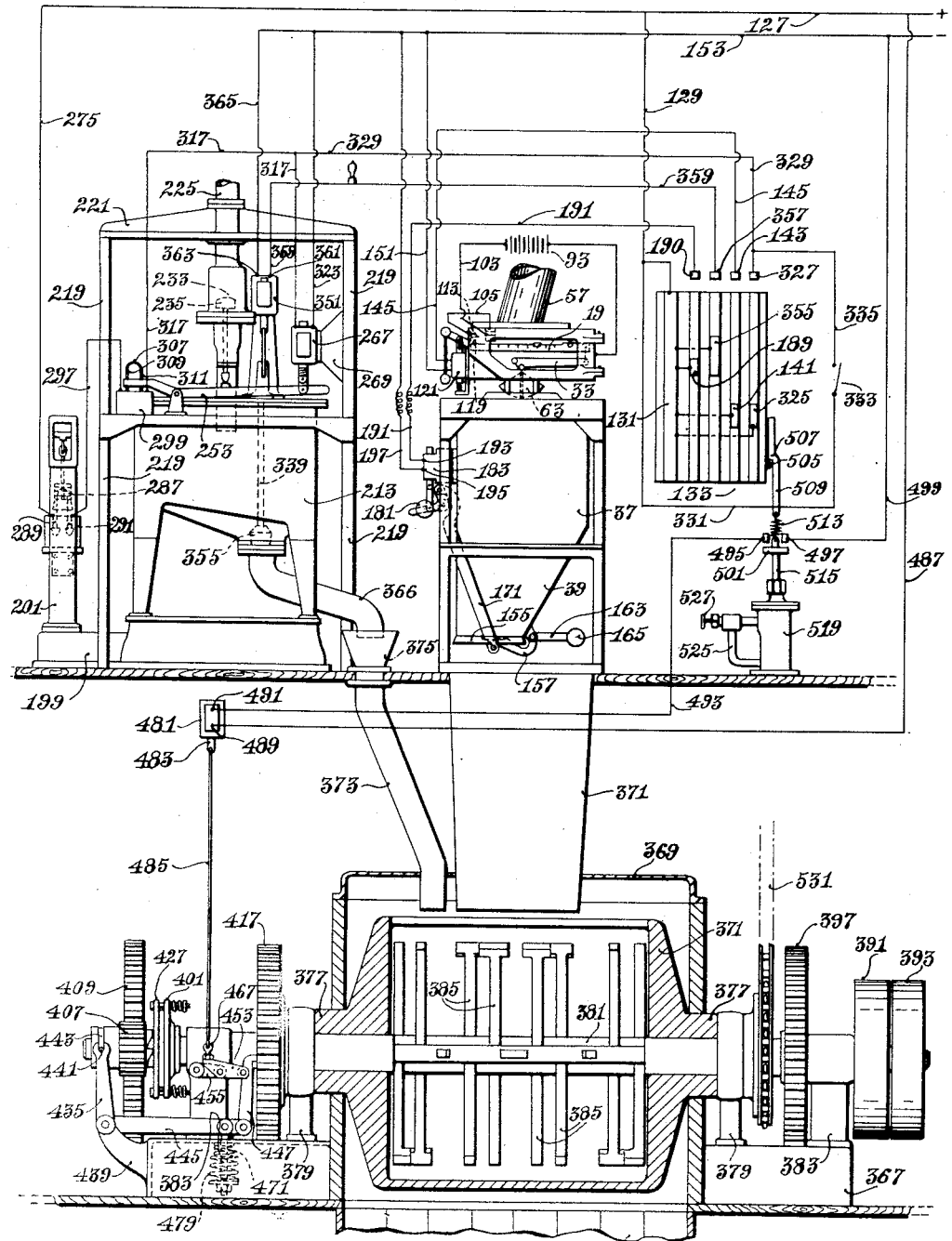
Fig. 1 is a view of the apparatus partly in elevation and partly in section, and showing the electrical devices and the wiring therefor.

The circuit for this solenoid may comprise a main positive conductor 127 (Fig. 1) receiving its current from a suitable source of supply. A branch conductor 129 leads from the main conductor to a ring 131 on a commutator 133 shown in side elevation in Fig. 8, and in development in Fig. 1. This commutator may be in the form of a cylinder 135 mounted on a shaft 137 carried by a plate 139 which may be secured to a wall or other appropriate support. This commutator may be rotated in unison with the mixer casing, as will be hereinafter described.

A contact 141 (Figs. 1 and 8) is mounted on the commutator, and is electrically connected with the contact ring 131. In the course of the rotation of the commutator, the contact 141 will be brought into engagement with a brush 143 which is connected by a conductor 145 with one of the terminals 147 of the solenoid 121. The other terminal 149 of this solenoid is connected by a branch conductor 151 with the main negative conductor 153.

The construction is such that when the commutator contact 141 is brought into engagement with the brush 143, the solenoid 121 will be energized, thereby drawing its core 123 and the link 125 downward. The latter in turn will pull the handle 84 downward, open the shutter, and bring the latch 81 into position to be held by the solenoid lock 87.

Having described the means for opening and closing the shutter to control entrance of charges into the container 37, next will be described the means for controlling the discharge of materials from the container. This means, in the present instance, comprises a valve conveniently in the form of a gate 155 (Figs. 2 and 3) having arms 157 fast on a rock shaft 159 journalled in bearings in brackets 161 mounted on the container 37. Fast on the shaft 159 is an arm 163 carrying a weight 165 which tends to close the gate 155.

Depending from the gate are lugs 167 receiving a rod 169 connected by upwardly rising links 171 with short arms 173 fast on a rock shaft 175 journalled in brackets 177 mounted on the container. Arms 179 fast on the rock shaft 175 carry weights 181 which may also assist in closing the gate 155.

The links 171 have their upper portions curved so as to pass the rock shaft 175 and be pivotally connected with the short arms 173 at points substantially in line with the links 171. The construction is such that when the gate 155 is closed, the points of pivotal connection of the links with the short arms may be on a dead center with respect to the axis of the rock shaft 175, and thereby securely hold the gate 155 in closed position. When the arm 179 is rocked slightly in a clockwise direction, it will throw said pivotal points off from their dead center positions. Thereupon, the weight of the materials upon the gate 155 will become effective to open the gate and allow discharge of materials. So soon as the materials have been discharged, the weights 165 and 181 will become effective to return the gate to its closed position.

Suitable means may be provided automatically to rock the arms 173 to throw their points of pivotal connection with the links 171 off from their dead center positions, so as to allow the gate 155 to open. This means, in the present instance, comprises a solenoid 183 having a core 185 connected by a link 187 with the arm 179.

The commutator may have a contact 189

(Figs. 1 and 8) electrically connected with the commutator ring 131 and adapted to engage a brush 190 connected by a conductor 191 with one of the terminals 193 of the solenoid 183. The other terminal 195 of the solenoid is connected by a conductor 197 with the main negative conductor 153.

The construction is such that in the course of the rotation of the commutator, the contact 189 will engage the brush 190, and thereby energize the solenoid 183. This will pull the core 185 thereof and the link 187 upward, thereby rocking the arms 173 and 179 slightly in a clockwise direction so as to throw the points of pivotal connection of the arms 173 with the links 171 off from their dead center positions, thereby allowing the gate 155 to open and discharge the materials from the container.

Thus, by the construction described, successive charges of materials, such, for example, as ground phosphate rock, may be automatically delivered to the container of the weighing machine and be automatically delivered therefrom.

The machine for measuring the charges of acid may be of any suitable construction, and in the present instance, comprises a weighing machine of the platform scale type. This machine comprises a platform 199 (Figs. 1, 5, and 6) having a column 201 rising therefrom and supporting the usual beam 203 provided with a poise 205. Depending from the free end of the beam is a link 207 carrying weights 209.

Mounted upon the platform of the scale are feet 211 supporting a container 213 which may have a lining 215 of lead or other appropriate material which cannot be injured by the acid.

Suitable means may be provided to deliver the acid from an appropriate source of supply to the container 213. To accomplish this, in the present instance, a support 217 may be provided comprising uprights 219 adjacent the scale platform, and may have their upper ends connected by a cross bar 221. This cross bar carries an inlet pipe 223 for receiving the acid, and a vent pipe 225 communicating with the inlet pipe 223. A fitting 227 communicates with the pipe 223, and is provided with a spout 229 entered through the upper end of the container 213. The upper end of the fitting 227 may be formed to present a seat 231 for a valve 233. This valve has a head 235 which may be recessed to receive a gasket 237 of rubber or other suitable material to secure a tight fit on the seat 231.

Depending from the valve head 235 is a sleeve 239 having a sliding fit in a bore in the fitting.

A plug 241 is threaded into a bore in the lower end of the fitting, and has a collar 243 projecting up into the sleeve 239.

Suitably secured to the valve head 235 is a stem 245 which projects downward through the collar 243 and a bore in the plug 241. The lower end of the stem has a cap 247 adapted for engagement with means to be described for lifting and opening the valve.

The fitting 227 may have a narrow annular chamber 249 surrounding the sleeve 239, and may communicate with a port 251 beneath the spout 229 and leading to the container 213.

The construction is such that any acid leaking down between the fitting bore and sleeve 239, may readily flow out through the port 251 into the container, and will not rise above the top of the plug collar so as to escape down between the collar and the valve stem.

Suitable means may be provided for controlling the valve 233 to admit acid into the container and to interrupt the flow of the acid thereto as required. This means, in the present instance of the invention, comprises a lever 253 (Figs. 5 and 6) fulcrumed intermediate its ends on a bracket 255 mounted on a channel cross bar 257 secured to the uprights 219 referred to. The valve stem cap 247 may rest on a seat 259 on the lever 253. The construction is such that when the lever is rocked in a contra-clockwise direction, the valve will be open, and when the lever is rocked in a clockwise direction, the valve may close to its seat under the influence of gravity. Downward movement of the lever 253 may be limited by engagement of a button 263 on the under side of the lever with an adjustable stop 265 mounted on the channel bar 257.

Suitable means may be provided for rocking the lever 253 to control the valve. This means, in the present instance, comprises a solenoid 267 (Figs. 1 and 5) carried by a bracket 269 mounted on one of the uprights 219. This solenoid may have a core 271 connected by a spring 272 and a link 273 with the lever 253 adjacent the right hand end thereof (Fig. 5).

The circuit for this solenoid comprises a conductor 275 (Fig. 1) leading from the main positive conductor 127 to a terminal 279 mounted on a box 281 and insulated therefrom. This box may be mounted on a bracket 283 supported by the column 201 of the weighing machine. The terminal 279 dips in mercury in a cup 285 mounted in the box 281. A U-shaped contact 287 suitably secured to the lowest weight for the beam 203, has one leg 289 dipping into the mercury in the cup 285, and another leg 291 dipping into mercury in another cup 293 mounted in the box 281. A terminal 295 dips in mercury in the cup 293, and is secured to the box 281, and is insulated therefrom. This terminal is connected by a conductor 297 with a terminal 299 secured to a box 301 and insulated therefrom, said box being mounted on the channel cross bar 257 referred to, and beneath an end 303 of the valve operating lever 253. The terminal 299 dips in mercury in a cup 305 mounted in the box 301. A U-shaped contact 307 suitably mounted on the lever portion 303, has one leg 309 adapted to dip in the mercury in the cup 305, and another leg 311 adapted to dip in mercury in a cup 313 mounted in the box 301. A terminal 315 dips in the mercury in the cup 313, and is secured to the box 301 and insulated therefrom. A conductor 317 leads from the terminal 315 to one of the terminals 319 of the solenoid 267 referred to. The other terminal 321 of the solenoid is connected by a conductor 323 with the main negative conductor 153.

When the solenoid 267 is de-energized, the valve lever 253 will rock in a clockwise direction, allow the valve 235 to close, and raise the legs of the U-shaped contact 307 out of the mercury in the cups 305 and 313, thereby interrupting the circuit for the solenoid at this point.

In order to open the valve 235, it is necessary to provide a circuit for the solenoid 267 which shall be independent from the circuit including the U-shaped contact 287 carried by the scale beam and the U-shaped contact 307 carried by the valve lever 253.

This circuit may be closed automatically by the commutator which is provided with a contact 325 adapted to engage a brush 327 in the course of the rotation of the commutator, said brush being connected to a conductor 329 which leads to the conductor 317 referred to, connected to the terminal 319 of the solenoid 267.

The consequence is that in the course of the rotation of the commutator, the contact 325 thereon on engagement with the brush 327 will complete the circuit to the solenoid 267, thereby rocking the lever 253 in a contra-clockwise direction, and this movement will raise the valve 233 and thereby admit acid into the scale container 213.

Energization of the solenoid 267 and rocking of the valve lever 253 as described, cause the U-shaped contact 325 carried by said lever to dip into the mercury cups 305 and 313.

When the container is empty and when the acid commences to pour therein, the scale beam 203 will be in down position, thereby causing the U-shaped contact 325 carried by the beam to dip into the mercury cups 285 and 293, as will be noted in Figs. 5 and 6. This completes the circuit to the solenoid 267 independently of the commutator control circuit described. As a result, when the commutator has rotated to move its contact 325 beyond the brush 327, the solenoid 267 will remain energized to hold the valve open. This solenoid remains energized until the acid charge of predetermined weight has entered the container 313. Thereupon, the scale beam 203 will rise, thereby lifting the U-shaped contact 287 out of the mercury cups 285 and 293. This will break the circuit to the solenoid 267, thereby de-energizing the latter and allowing the acid control valve 233 to close under the influence of gravity and shut off further supply of acid to the container.

On de-energization of the solenoid 267, the valve lever 253 will rock in a clockwise direction, thereby lifting its U-shaped contact 307 out of the mercury cups 305 and 313, and breaking the circuit for the solenoid at this point. This is an important feature, since when the acid commences to discharge from the container 213, as hereinafter described, the scale beam 203 will rock down again and cause the beam carried contact 287 again to dip into the mercury cups 285 and 293. This would complete the circuit to the solenoid 267 and open the acid inlet valve again, and prior to complete discharge of the acid from the container, were it not for the fact that the solenoid circuit is broken by lifting the U-shaped contact 307 out of the mercury cups 305 and 313. Thus, after the solenoid circuit has been interrupted by rise of the scale beam, it remains interrupted until again completed by rotation of the commutator to bring the contact 325 into engagement with the brush 327. Thereupon, the solenoid 267 will be again energized, and the acid valve will be opened at the proper time to admit the next acid charge into the container 213.

In some instances it may be desirable to close the circuit to the solenoid 267 to open the acid valve manually and independently of the commutator control. To accomplish this, in the present instance, a conductor 331 (Fig. 1) may lead from the positive branch conductor 129 referred to, to a switch 333 which may be conveniently of the well known push button type. This switch in turn may be connected by a conductor 335 with the conductor 329 referred to, leading to the solenoid 267. As a consequence, when the switch 333 is closed, the circuit to the solenoid 267 will be completed, thereby rocking the valve lever 253 in a contra-clockwise direction so as to open the acid valve. This will cause the U-shaped contact 307 carried by said lever to dip into the mercury cups 305 and 313 and complete the circuit to the solenoid as previously described, and independently of the momentary energization of the solenoid by closing the switch 333.

To prevent arcing or withdrawal of the scale beam contact 287 and the valve lever contact 307 from their cups, one of the legs of each may be longer than the other, so that both legs will not be withdrawn from the mercury cups simultaneously.

Having described the acid inlet valve for the container 213 and the control therefor, next will be described the means for controlling the discharge from the container. This means, in the present instance, comprises a valve 335 (Figs. 1, 5 and 6) provided with a seat 337 at the bottom of the container, and the latter may be inclined to cause the acid to flow readily toward the valve. Projecting upward from the valve is a stem 339 extending through the top of the container 213, and having its upper end connected by a link 341 with a lever 343 fulcrumed on a bracket 344 mounted on the top of the container. One end of the lever 343 may have a handle 345 to enable manual operation of the valve 335 if desired.

To enable automatic control of the valve, the opposite end of the lever 343 may be connected by a link 347 to the core 349 of a solenoid 351 which may be mounted on a bracket 353 rising from the top of the container.

This solenoid may be energized at the proper time to open the valve 335 to effect the discharge under the control of the commutator which may be provided with a contact 355 (Fig. 1) adapted in the course of the rotation of the commutator to engage a brush 357 connected by a conductor 359 with one of the terminals 361 of the solenoid 351. The other terminal 363 of the solenoid may be connected by a conductor 365 with the main negative conductor.

The construction is such that in the course of the rotation of the commutator, the contact 355 thereon will engage the brush 357 and complete the circuit to the solenoid 351, thereby energizing the latter and causing the same to draw its solenoid upward, rock the lever 343 in a clockwise direction and open the valve 335, thereby allowing the acid to discharge from the container. Depending from the container 213 beneath the valve 335 is a pipe 366 which may be curved and extended laterally beyond the scale platform as will be noted in Fig. 5. This pipe is adapted to conduct the acid charge from the container to the mixer to be described.

It is desirable that the acid shall commence to discharge from the container 213 somewhat prior to the commencement of the discharge of the ground phosphate rock from the container 37. To accomplish this, the leading end of the contact 355 on the commutator is placed somewhat in advance of the leading end of the contact 189 on the commutator. Also, the acid requires a somewhat longer period to discharge from its container than required by the ground phosphate rock to discharge from its container. Accordingly, the contact 355 is made sufficiently long to continue energization of the solenoid 351 a sufficient period to enable the acid charge to flow from the container. When the contact 355 has been carried by the commutator beyond the brush 357, the circuit for the cylinder 351 will be broken, and the latter will be de-energized, thereby allowing the valve 335 to close under the influence of gravity.

Having described the mechanism for weighing successive charges of ground phosphate rock, and the mechanism for weighing the successive charges of acid, next will be described the means for mixing the charges of ground phosphate rock and acid. As stated, this means may be substantially the same as that disclosed in my Letters Patent referred to.

This mixer comprises a suitable base or support 367 (Figs. 7 and 8) supporting a housing 369 having an opening in the top thereof receiving a chute 371 (Fig. 1) for conducting the charges of ground phosphate rock from the scale container 37 to the mixer. The top of said housing also has an opening receiving a pipe 373 having a mouth 375 at the upper end thereof beneath the delivery end of the pipe 366 referred to. The acid charges may flow from the acid scale container through the pipe 366, mouth 375 and pipe 373 to the mixer. Mounted within the housing 369 is a rotary casing 371 having a mouth or opening 374 in the wall thereof adapted to come into registration with the chute 371 and pipe 373 to receive the materials therefrom. In the course of the rotation of this casing, the mouth will be moved from its up or receiving position through an arc of substantially 180° to bring the mouth to its down or discharge position. The mixed materials discharged from the mouth may be conducted by the chute 375 of suitable construction to the den referred to.

The rotary casing 371 may have hubs 377 at the ends thereof journalled in bearings in standards 379 rising from the base 367.

Projecting through and beyond the casing is a shaft 381 journalled in bearings in standards 383 rising from the base 367. Mounted on the shaft 381 within the rotary casing 371 are paddles 385 for mixing the materials introduced into the casing.

Suitable means may be provided to rotate the shaft and paddles at a more rapid speed than the rotary casing, in order that the materials may be thoroughly mixed while the casing is slowly rotating to carry its mouth from receiving to discharge position.

This means, in the present instance, comprises a countershaft 387 (Fig. 7) journalled in bearings in standards 389 rising from the machine base 367. Mounted on the shaft 387 are fast and loose pulleys 391 and 393, and the former may be driven by a belt from any suitable source of power. Fast on the shaft 387 is a pinion 395 meshing with a gear 397 fast on the paddle shaft 381.

To impart rotation to the casing 371 from the paddle shaft, a stub shaft 399 may be provided having a disk plate 401 projecting from one end thereof secured by bolts 403 to a flange 405 on one end of the paddle shaft 381.

A pinion 407 is mounted loose on the stub shaft, and meshes with a large gear 409 on a back shaft 411 journalled in bearings on standards 413 rising from the base. Fast on the back shaft is a pinion 415 meshing with a gear 417 which is secured to one of the hubs of the rotary casing.

The pinion 407 may have clutch teeth 419 projecting from one end thereof for co-operation with clutch teeth 421 projecting from a friction disk 423 loose on the stub shaft. This friction disk may have a series of holes adjacent the periphery thereof adapted to receive inserts 425 of wood or other suitable material.

Opposed to these inserts is a ring 427 yieldingly urged toward the disk plate by coil springs 429 confined between the disk plate 401 and caps 431 on bolts 433 entered through the ring and disk plate.

The construction is such that the inserts 425 will be pressed by the coil springs 429 into frictional engagement with the ring 427 and disk plate 401, and when the pinion 407 is adjusted on the stub shaft 399 to bring its teeth 419 into clutching engagement with the friction plate teeth 421, the drive will be frictionally transmitted from the paddle shaft 381 to the pinion 407. The drive will be transmitted from the latter through the gear 409, pinion 415, and gear 417 to the rotary casing 371. The frictional connection between the paddle shaft 381 and the pinion 407 will enable the ring 427 and disk plate 401 to slip relatively to the wood inserts of the friction disk 423 so as gradually to overcome the inertia of the casing and start rotation thereof without liability of shearing gear teeth of the transmission or other injury thereto.

Suitable means may be provided for sliding the pinion 407 along the stub shaft to connect the clutch teeth to initiate rotation of the mixer casing, or to dis-connect the clutch teeth to arrest rotation of the mixer casing when the mouth of the latter comes into receiving position. To accomplish this, in the present instance of the invention, a pair of arms 435 may be mounted fast on a rock shaft 437 carried by brackets 439 projecting laterally from the base, and the upper ends of said arms may have pins 441 entered into a circumferential groove 443 in the hub of the pinion 407.

Fast on the rock shaft 437 is an arm 445, and pivotally connected to the free end thereof is a stop arm 447 having a nose 449 adapted for engagement with a stop lug 451 projecting from the face of the gear 417 referred to.

To move the stop arm 447 into and out of position for engagement with the stop lug 451 of the gear, a toggle device may be provided comprising links 453 and 455 pivotally connected by a pin 457. The link 453 may be pivotally connected by a pin 459 to the stop arm, and the link 455 is mounted fast on a rock shaft 461 mounted in brackets on one of the paddle shaft bearings 383. The toggle link 453 has an extension 463 projecting from the link 455, and said extension may be provided with an adjustable stop screw 465 provided with an eye 467.

Pivotally connected to and depending from the arm 445 referred to, is a rod 469 projecting through a flange 471 on the base. A coil spring 473 encircles the rod and is confined between the flange 471 and a cup 475 seated on a nut 477. A larger and heavier coil spring 479 encircles the coil spring 473 and rests on a flange of the cup, said larger spring 479 being shorter than the smaller spring 473.

When it is desired to move the clutch to initiate rotation of the casing, the eye 467 of the toggle is pulled upward by means to be described, thereby buckling the toggle and withdrawing the stop arm 447 out from engagement with the stop lug 451 on the gear 417. Thereupon, the coil spring 473 operates through the rod 469 to pull the arm 445 downward. This rocks the arms 435 toward the right, thereby sliding the pinion 407 along the stub shaft 399 and causing the pinion clutch teeth 419 to engage the friction disk clutch teeth 421.

Then the drive will be transmitted from the paddle shaft 381 through the frictional device and the clutch teeth to the pinion 407, which will rotate the gear 409, pinion 415 and gear 417, and cause rotation of the mixer casing 371.

The casing having received charges of ground phosphate rock and acid to be mixed, will slowly rotate to carry its mouth through a complete rotation. As the mouth approaches its lowest position, it discharges the mixed materials from the casing, the motion of the latter being sufficiently slow readily to permit this discharge.

The stop lug 451 is so positioned on the gear 417, that when said lug has been rotated around into contact with the stop arm nose 449, the mouth of the casing will be in registry with the chute 371 and pipe 373 in readiness to receive the next charge of ground phosphate rock and acid therefrom.

When the stop lug 451 engages the stop arm nose 449, the gear 417 pulls the stop arm 447 upward, thereby rocking the arm 445 upward, which throws the arms 435 to the left, thereby opening the clutch. As the arm 445 rocks upward, the coil spring 479 is brought into engagement with the base flange 471, and serves yieldingly to arrest rotation of the casing. Thus, the momentum of the casing is gradually overcome, and it is brought to rest without injury to the mechanism.

When the toggle is straightened, it securely holds the stop arm in position to be engaged by the gear stop lug 451. Since the nose of the stop arm is offset to the right from the axis of the pin connecting the stop arm with the arm 445, on engagement of the lug with the nose there is a component of force tending to rock the stop arm in a contra-clockwise direction. To prevent liability of buckling of the toggle by this force, the stop screw 465 may be adjusted so that when the toggle is in locking position, the axis of the pin 457 connecting the toggle links will be somewhat beneath a straight line passing through the axes of the pins 459 and 461. The consequence is that the component of force referred to, will tend to buckle the links downward, but this will be resisted by engagement of the stop screw 465 with the upper edge of the toggle link 455.

The toggle should be buckled to close the clutch and start rotation of the mixer casing after the mouth of the latter has dwelt in receiving position. Suitable means may be provided to accomplish this operation automatically. In the present instance, this means comprises a solenoid 481 (Fig. 1) having a core 483 connected by a rod 485 with the stop screw eye 467 referred to, for the toggle.

Current is supplied to the solenoid 481 from the main positive conductor 127 through a conductor 487 connected to one of the terminals 489 of the solenoid. Connected to the other terminal of the solenoid is a conductor 493 leading to a fixed contact 495. A companion fixed contact 497 is connected by a conductor 499 with the main negative conductor 153.

The fixed contacts 495 and 497 may be connected by a bridge contact 501 adapted to be actuated by the commutator. To accomplish this, in the present instance, the commutator cylinder 135 referred to, may have a wheel 503 (Figs. 8 and 9) fast thereon, and provided with a lug 505 adapted to engage a shoulder 507 on a shift bar 509 mounted to reciprocate in suitable guides 511. The lower end of the shift bar 509 is connected by a coil 513 with a stem 515 carrying the bridge contact 501. The stem has a piston 517 fast thereon mounted in a cylinder 519. A coil spring 521 may be mounted in the cylinder 519 and confined between the upper head thereof and the piston 517.

The piston 517 may be provided with a valve 523 adapted to prevent flow of fluid through the piston when the latter is moved upward, but permit flow of fluid through the piston when the latter is moved downward.

A by-pass 525 has ends connected to and communicating with the cylinder 519 at points above and beneath the piston 517. This by-pass may be provided with an adjustable needle valve 527.

The construction is such that in the course of the rotation of the commutator cylinder, the lug 505 on the wheel 503 will engage the bar shoulder 507 and shift the bar 509 upwardly. This will tension the coil spring 513, and the bridge contact 501 will be gradually moved toward and ultimately to the fixed contacts 495 and 497 under the influence of the tensioned coil spring 513 as checked by the slow flow of fluid in the cylinder from above the piston around through the by-pass to the under side of the piston. The cylinder may contain oil or other suitable fluid. When the bridge contact 501 comes into engagement with the fixed contacts 495 and 497, the circuit will be completed to the solenoid 481, which will then be energized and draw its core 483 and the rod 485 upward, thereby buckling the toggle. This will close the clutch in the transmission for the rotary casing, and initiate rotation thereof. The casing will slowly rotate through a complete revolution, and when its mouth has been brought up to receiving position, rotation of the casing will be automatically arrested as described. In the course of the rotation of the casing, the mouth will be brought in its down position to discharge the mixed materials from the casing. The purpose of the check device for the bridge contact 501 is to enable the mouth of the casing to dwell in receiving position a sufficient length of time for the charges to flow from the scale containers. The needle valve 527 may be adjusted to vary the retarding effect of the check device, and thereby vary the length of time required for the bridge contact 501 to move to and into engagement with the fixed contacts 495 and 497.

In the course of the rotation of the commutator wheel 503 the lug 505 thereon will be carried laterally out from beneath the shoulder 507 of the shifter bar 509. Thereupon, the coil spring 521 will become effective to pull the shifter bar and the bridge contact 501 down, thereby causing the latter to be disconnected from the fixed contacts 495 and 497. This will interrupt the circuit for the solenoid 481, thereby de-energizing the latter and causing the toggle to be straightened under the influence of gravity and rock the arm 447 toward the right (Figs. 1 and 8) to bring the nose 449 thereof into position to be engaged by the gear lug 451 in the course of the next rotation of the mixer casing, thereby automatically to arrest said casing when its mouth is brought in receiving position.

As stated, the commutator is rotated in unison with the mixer casing. To accomplish this, in the present instance, one of the hubs 377 of the mixer casing is provided with a sprocket wheel 529 (Fig. 8) connected by a sprocket chain 531 with a sprocket 533 formed on the commutator wheel 503 referred to. The sprockets 529 and 533 are of the same size, and as a consequence, the commutator makes a complete rotation each time the mixer casing makes a complete rotation.

It is desirable to provide means for indicating when the rotary casing mouth of the mixer is receiving and discharging materials. To accomplish this, in the present instance, the commutator wheel 503 may be marked with the word "charge" and the word "discharge" at diametrically opposed points on the face of said wheel, and arrow heads may be placed at the ends of these words to mark the length of the arcs of the wheel. Co-operating with these words is an index 535 which may overlap the margin of the wheel, and may be formed at the end of an arm 537 carried by the plate 139 which supports the commutator. When the words "charge" and "discharge" are passing the index, it will indicate that the materials are being discharged into and from the mixer.

The operation of the apparatus will be readily understood from the foregoing description. The ground phosphate rock and acid are conducted from any suitable source of supply to the containers. When the charges of predetermined weights have flowed into the scale containers, the inlet valves therefor will be automatically closed, thereby to interrupt the flow to said containers.

After the charges of predetermined weights have entered the containers, the outlet valves therefor will be automatically opened under control of the commutator, and the charges will be promptly delivered into the mixer.

After the charges have been delivered from the scale containers into the mixer, the outlet valves will be automatically closed.

After the charges have been delivered from the scale containers, the inlet valves will be automatically opened to admit the next charges under the control of the commutator.

The charges are automatically delivered to the mixer when the mouth of the rotary casing thereof is in its up or receiving position. The charges will be thoroughly mixed in the mixer while the casing is rotating from its up or receiving position to its down or discharging position, and the mixed materials will be automatically delivered from the casing as the mouth passes its down position.

The commutator driven from the mixer casing and in unison therewith, has its contacts so disposed on the cylinder of the commutator, that the outlet valves of the scale containers will be automatically opened when the casing mouth is in receiving position, and the inlet valves of the scale containers will be automatically opened after the outlet valves have been opened a sufficient length of time to insure delivery of the charges to the mixer.

The character of the apparatus is such that successive charges may be automatically measured accurately by weight, delivered to the mixer, thoroughly mixed thereby, and then delivered from the mixer.

It will be understood that the invention is not limited to the specific embodiment shown, and that various deviations may be made therefrom without departing from the spirit and scope of the appended claims.

What is claimed is:

1. An apparatus of the character described, comprising, in combination, a mixer, scales having containers, inlet valves for admitting materials to said containers, outlet valves for delivering the materials from said containers to said mixer, that they may be mixed by the latter, and electrical means operable in response to operation of the scales for closing the inlet valves on delivery of charges of predetermined weight to said containers.

2. An apparatus of the character described, comprising, in combination, weighing devices for automatically measuring charges of materials of predetermined weight, a mixing machine including a rotary casing having a mouth movable to receiving and discharging positions, and means operable in response to rotation of said casing for automatically delivering the charges from the weighing devices to said casing when the mouth of the latter is in receiving position.

3. An apparatus of the character described, comprising, in combination, a mixer weighing devices including weighing beams and containers for receiving charges of materials, inlet valves for controlling the supply of materials to said containers, electrical means operable in response to movement of said beams for automatically closing said inlet valves when charges of predetermined weights have entered said containers, and means including electrical circuits, magnets, a commutator in said circuits for automatically opening said inlet valves after delivery of charges therefrom and a transmission means connecting the mixer and commutator.

4. An apparatus of the character described, comprising, in combination, weighing devices having containers for receiving charges of materials, outlet valves for said containers, a mixer having a rotatable casing provided with a mouth for receiving materials discharged from said outlet valves, means including magnets, electrical circuits and a commutator for opening said valves, and means for rotating the commutator with the mixer casing, said commutator having provision for automatically closing said circuits to energize said magnets and open said valves when the mouth of the casing is in receiving position.

5. An apparatus of the character described, comprising, in combination, weighing devices having containers for receiving charges of materials, discharge valves for said containers, a mixer having a rotary casing provided with a mouth for receiving the materials delivered through the discharge valves, and means for automatically opening said discharge valves when the mouth of the mixer casing has been rotated to receiving position.

6. An apparatus of the character described, comprising, in combination, weighing devices provided with containers for receiving charges of materials, outlet valves for said containers, a mixer having a rotary casing provided with a mouth for receiving the materials delivered from said outlet valves, means automatically to arrest rotation of said casing when its mouth is in receiving position, and means for automatically initiating rotation of said casing after delivery of the materials from said containers into said casing.

7. An apparatus of the character described, comprising, in combination, weighing devices provided with containers for receiving charges of materials, outlet valves for said containers, a mixer having a rotary casing provided with a mouth for receiving the materials delivered from said outlet valves, means automatically to arrest rotation of said casing when its mouth is in receiving position, and electrical means for automatically initiating rotation of said casing after delivery of the materials from said containers into said casing.

8. An apparatus of the character described, comprising, in combination, weighing devices having containers for receiving charges of materials, outlet valves for said containers, a mixer having a rotary casing provided with a mouth movable to a position to receive materials delivered by said outlet valves from said containers, means automatically to arrest rotation of said casing when its mouth has been brought to receiving position, and means including a magnet, an electrical circuit for said magnet, a switch in said circuit, and means for automatically closing said switch to energize said magnet to initiate rotation of the mixer casing after its mouth has dwelled for a predetermined period in receiving position.

9. An apparatus of the character described, comprising, in combination, weighing devices having containers for receiving charges of materials, outlet valves for said containers, a mixer having a casing provided with a mouth movable to a position to receive the charges from said containers, means including magnets, electrical circuits and a commutator for automatically opening said outlet valves to deliver the charges from the containers into the mixer casing, means for initiating rotation of said casing after delivery of the charges therein including a magnet, an electrical circuit therefor, a switch in said circuit, and means operated by said commutator for closing said switch to energize said magnet.

10. An apparatus of the character described, comprising, in combination, weighing devices having containers for receiving charges of materials, outlet valves for said containers, a mixer having a casing provided with a mouth movable to a position to receive the charges from said containers, means including magnets, electrical circuits and a commutator for automatically opening said outlet valves to deliver the charges from the containers into the mixer casing, means for automatically initiating rotation of said casing after delivery of charges therein including a magnet, an electrical circuit for said magnet, a switch in said circuit, means operated by said commutator for closing said switch to complete said circuit and energize said magnet, and a retarding device for delaying closure of said switch.

11. An apparatus of the character described, comprising, in combination, weighing devices having containers for receiving charges of materials, outlet valves for said containers, a mixer having a casing provided with a mouth movable to a position to receive the charges from said containers, means including magnets, electrical circuits and a commutator for automatically opening said outlet valves to deliver the charges from the containers into the mixer casing, means for automatically initiating rotation of said casing after delivery of charges therein including a magnet, an electrical circuit for said magnet, a switch in said circuit, means operated by said commutator for closing said switch to complete said circuit and energize said magnet, a retarding device for delaying closure of said switch, and adjustable means for varying the delay occasioned by said retarding device.

12. A machine of the character described comprising a mixer a weighing beam, a container for receiving charges of materials and for delivering the same to said mixer, inlet and outlet valves for said container, means for operating said inlet valve including a lever, a magnet operatively connected to said lever, an electrical circuit for said magnet, a switch in said circuit adapted to be opened on movement of said beam when a charge of predetermined weight has entered the container, a switch in said circuit closed by said lever on energization of said magnet, a starting circuit for said magnet, a commutator in the latter circuit for energizing said magnet to cause said lever to close its switch in the first-mentioned circuit, said commutator and mixer being provided with means for imparting rotation from one to the other.

13. A machine of the character described comprising a rotatable mixer, a container for receiving charges of materials and for delivering the same to said mixer, an inlet valve for controlling delivery of the charges into said container, an outlet valve for controlling delivery of the charges from said container to said mixer, and means for controlling said outlet valve including an electrical circuit, a magnet in said circuit, members connecting said magnet with said valve movable to a dead center position to hold the valve in closed position, and movable from dead center position on energization of the magnet, and means operated on rotation of the mixer for controlling said circuit.

14. A machine of the character described comprising a mixer, a container for receiving charges of materials, an inlet valve for controlling delivery of the charges into said container, an outlet valve for controlling delivery of the charges from said container to said mixer, and means including an electrical device and means controlled by the mixer for releasing the outlet valve to allow opening of the latter by the weight of materials thereon.

15. A machine of the character described comprising a mixer, a container for receiving charges of materials, an inlet valve for controlling delivery of the charges into said container, an outlet valve for controlling delivery of the charges from the container to the mixer, controlled by the mixer means to open the outlet valve, and means automatically to close the outlet valve on delivery of the charges from the container.

16. A machine of the character described comprising, in combination, weighing devices having containers for receiving charges of materials, inlet and outlet valves for said containers, a mixer for receiving the charges from said containers, means for opening the inlet valves, means controlled by the weighing devices for automatically closing the inlet valves on delivery of charges of predetermined weight to the containers, means for opening the outlet valves to deliver the charges from the containers to the mixer, and means for closing the outlet valves in readiness for admission of charges into the containers.

17. An apparatus of the character described, comprising, in combination, weighing devices having containers for receiving charges of materials, inlet and outlet valves for said containers, a mixer for receiving the charges from the containers, means controlled by the mixer for opening the inlet valves to admit charges into the containers, means controlled by the weighing devices for automatically closing the inlet valves on delivery of charges of predetermined weight into the containers, and means controlled by the mixer for opening the outlet valves to control delivery of the charges from the containers to the mixer.

18. An apparatus of the character described, comprising, in combination, weighing devices having containers for receiving charges of materials, inlet and outlet valves for said containers, a mixer for receiving the charges from the containers, means for opening the inlet valves to admit charges into the containers, electrical means controlled by the weighing devices for automatically closing the inlet valves on delivery of charges of predetermined weight to the containers, and electrical means controlled by the mixer for automatically opening the outlet valves to deliver the charges from the containers to the mixer.

19. An apparatus of the character described, comprising, in combination, weighing devices having containers for receiving charges of materials, inlet and outlet valves for said containers, a mixer for receiving the charges from the containers, electrical means controlled by the mixer for automatically opening the inlet valves to admit charges into the containers, and electrical means controlled by the mixer for automatically opening the outlet valves to deliver the charges from the containers to the mixer.

20. An apparatus of the character described, comprising, in combination, weighing devices having containers for receiving charges of materials, inlet and outlet valves for said containers, a rotary mixer having a mouth rotatable to a position to receive the charges from the containers, and means controlled by the rotary mixer for automatically opening the inlet valves to admit charges into the containers and for automatically opening the outlet valves when the mixer mouth is in position to receive charges from the containers.

In testimony whereof, I have signed my name to this specification.

THOMAS J. STURTEVANT.

Certificate of Correction.

It is hereby certified that in Letters Patent No. 1,483,048, granted February 5, 1924, upon the application of Thomas J. Sturtevant, of Wellesley, Massachusetts, for an improvement in "Apparatus for Measuring and Mixing Materials," errors appear in the printed specification requiring correction as follows: Page 5, line 52, for the numeral "325" read *307*, and line 58, for the numeral "325" read *287*; same page, line 127, for the word "or" read *on*; and that the said Letters Patent should be read with these corrections therein that the same may conform to the record of the case in the Patent Office.

Signed and sealed this 18th day of March, A. D., 1924.

[SEAL.]

KARL FENNING,
*Acting Commissioner of Patents.*